United States Patent [19]

Murai

[11] Patent Number: 5,454,140
[45] Date of Patent: Oct. 3, 1995

[54] CORD LOCKING DEVICE

[75] Inventor: Ryukichi Murai, Toyama, Japan

[73] Assignee: Yoshida Kogyo K.K., Tokyo, Japan

[21] Appl. No.: 272,087

[22] Filed: Jul. 8, 1994

[30] Foreign Application Priority Data

Jul. 30, 1993 [JP] Japan .................................. 5-190347

[51] Int. Cl.$^6$ .................................................. F16G 11/00
[52] U.S. Cl. ............... 24/136 R; 24/115 H; 24/134 KB; 403/211
[58] Field of Search ........................ 24/136 R, 136 K, 24/136 L, 134 KB, 134 KA, 115 M, 115 G; 403/211

[56] References Cited

U.S. PATENT DOCUMENTS

| 432,539 | 7/1890 | Mains ................................. 24/134 KB |
| 3,897,161 | 7/1975 | Reinwall, Jr. . |
| 3,953,144 | 4/1976 | Boden ..................................... 403/211 |
| 4,102,019 | 7/1978 | Boden . |
| 4,156,574 | 5/1979 | Boden . |
| 4,665,590 | 5/1987 | Udelhofen et al. ...................... 403/211 |

FOREIGN PATENT DOCUMENTS 0248290 12/1987 European Pat. Off. .
2661804 11/1991 France .

*Primary Examiner*—Victor N. Sakran
*Attorney, Agent, or Firm*—Hill, Steadman & Simpson

[57] ABSTRACT

A cord locking device of this invention comprises a casing having openings respectively at opposite ends and a longitudinal aperture in a front plate, and a slide adapted to be inserted in the casing. The slide has a pair of resilient grip portions extending from opposite sides of a head portion of the slide, and also has a pair of engaging portions each extending from a side surface of the slide between the head portion and a base of each of the grip portions. In order to increase the resilience, the slide further has a resilient portion situated between the grip portions. The slide additionally has a central resilient guide portion situated rearwardly of the head portion in such a manner that the guide portion should project outwardly from an outer surface of the front plate of the casing through the aperture when the slide is inserted in the casing. For locking and unlocking the cord, the slide is slided with the gripping of the grip portions. When the guide portion is depressed in the aperture, the slide can be removed from the casing for exchanging the cord with a new one.

4 Claims, 4 Drawing Sheets

CORD LOCKING DEVICE

BACKGROUND OF THE INVENTION

1. Field of the Invention

This invention relates to a cord locking device of synthetic resin for locking a cord to fasten an anorak, a rucksack, a life jacket, a shopping back, etc.

2. Description of the Related Art

This type of prior art cord locking device is exemplified by Japanese Patent Laid-Open Publication No. SHO 54-138799. This cord locking device comprises, as shown in FIG. 6 of the accompanying drawings, a tapering casing A, which opens at opposite ends and has a pair of parallel side walls C at the wide open end, and a slide B adapted to be slidably inserted in the casing A. The casing A has in a front plate there-of a longitudinal aperture D. The slide B has a head portion E, a neck portion F, a ring-shape grip portion G extending from one end of the neck portion F, and a pair of resilient slanting portions H projecting from opposite sides of a base of the neck portion F. The slide B has a saw-toothed surface J on each of opposite side of the head portion E. Each of the slanting portion H also has a saw-toothed surface K on its free end. Further, the slide B has a projection L extending between the head portion E and the neck portion F in such a manner that the projection L is received through the aperture D when the slide B is inserted in the casing A, so that the slide B is slidable within a limited range. As two parts of a cord are inserted through the gaps between the slide B and the respective side walls C of the casing A, the cord is locked by the saw-toothed surfaces J, K of the head portion E and the slanting portions H.

U.S. Pat. No. 4,102,019 also discloses a cord locking device of this kind. In the disclosed cord locking device, a resilient grip portion is bent and inserted in a casing in such a manner that a projection on the grip portion is slidably received in an aperture of the casing. A cord is fastened and locked between engaging projections on outer surfaces of the grip portion and opposite side walls of the casing.

Another cord locking device is known (Japanese Utility Model Publication No. HEI 2-46731) in which a slide is inserted in a casing in such a manner that a resilient guide projecting from the front surface of the slide is received in an aperture of the front plate of the casing, locking a cord between the opposite side walls of the casing and the side surfaces of the slide.

With the first-named known cord locking device, as shown in FIG. 6, when the cord is pulled leftwardly of the casing A, the slide B will be brought toward the narrow open end of the casing A to fasten the cord tightly. Reversely when the cord is pulled rightwardly, it will be difficult to lock the cord by the saw-toothed surface K of the free end of each slanting portion H under the resilience of the slating portions H only, thus simply loosening the cord. Partly since the cord can be fastened in only one way, and partly since the slide B cannot be removed from the casing A after it has once been inserted in the casing A, it is particularly troublesome to exchange the cord with a new one.

In the second-named cord locking device, when the cord is pulled toward the narrow open end of the casing, it will be fastened tightly. When the cord is pulled reversely, it will simply be loosened. Partly since the projection on the grip portion is formed integrally with the grip portion, and partly since the projection is rigid, the grip portion cannot be removed from the casing after the grip portion has once been inserted in the casing. It is therefore yet troublesome to exchange the cord with a new one.

In the case of the third-named cord locking device, since the slide has not a pair of grip portions, the inserting or sliding of the slide with respect to the casing is particularly troublesome.

SUMMARY OF THE INVENTION

It is therefore an object of this invention to provide a cord locking device in which a cord can be locked not only when pulled toward the narrow open end of a casing but also when pulled reversely toward the wide open end of the casing and in which the locking of the cord can be released in a very simple operation and in which the inserting and removing of a slide with respect to the casing can be performed and in which the cord can be threaded through the device in a simple operation.

In order to accomplish the above object, the cord locking device of this invention comprises: a casing having openings respectively at opposite ends and a longitudinal aperture in a front plate; and a slide adapted to be inserted in the casing, the slide having a pair of resilient grip portions extending from opposite sides of a head portion of the slide, the slide also having a pair of engaging portions each extending along a side surface of the slide between the head portion and a base of each of the grip portions, the slide further having a resilient portion situated between the grip portions, the slide additionally having a central resilient guide portion situated rearwardly of the head portion in such a manner that the guide portion should project outwardly from an outer surface of the front plate of the casing through the aperture when the slide is inserted in the casing.

Preferably, each engaging portion is divided into first and second halves respectively situated at the side surface of the head portion and the side surface of the base of each grip portion and having saw-toothed forms with the first and second halves of saw-teeth directing toward each other. Further, the casing has on each of inner surfaces of the opposite side walls a notched engaging portion.

In operation, firstly two parts of a cord are inserted through the casing, and then the head portion of the slide is inserted between the two cord parts in the casing from its wide open end, with the gripping of the grip portions, until the guide portion will be received in the aperture. With the continuous forcing of the slide into the casing, each part of the cord will be locked between the notched engaging portion of each side wall of the casing and the corresponding engaging portion of the slide.

For releasing the locking of the cord, the slide is pulled toward the wide open end of the casing with the gripping of the grip portions against the resilience of the resilient portion. As a result, the cord is unlocked to be released.

For separating the casing and the slide from each other, the slide is pulled with the depressing of the guide into the aperture of the casing.

DETAILED DESCRIPTION

Embodiments of a cord locking device according to this invention will now be described in detail with reference to the accompanying drawings.

Figure 1:
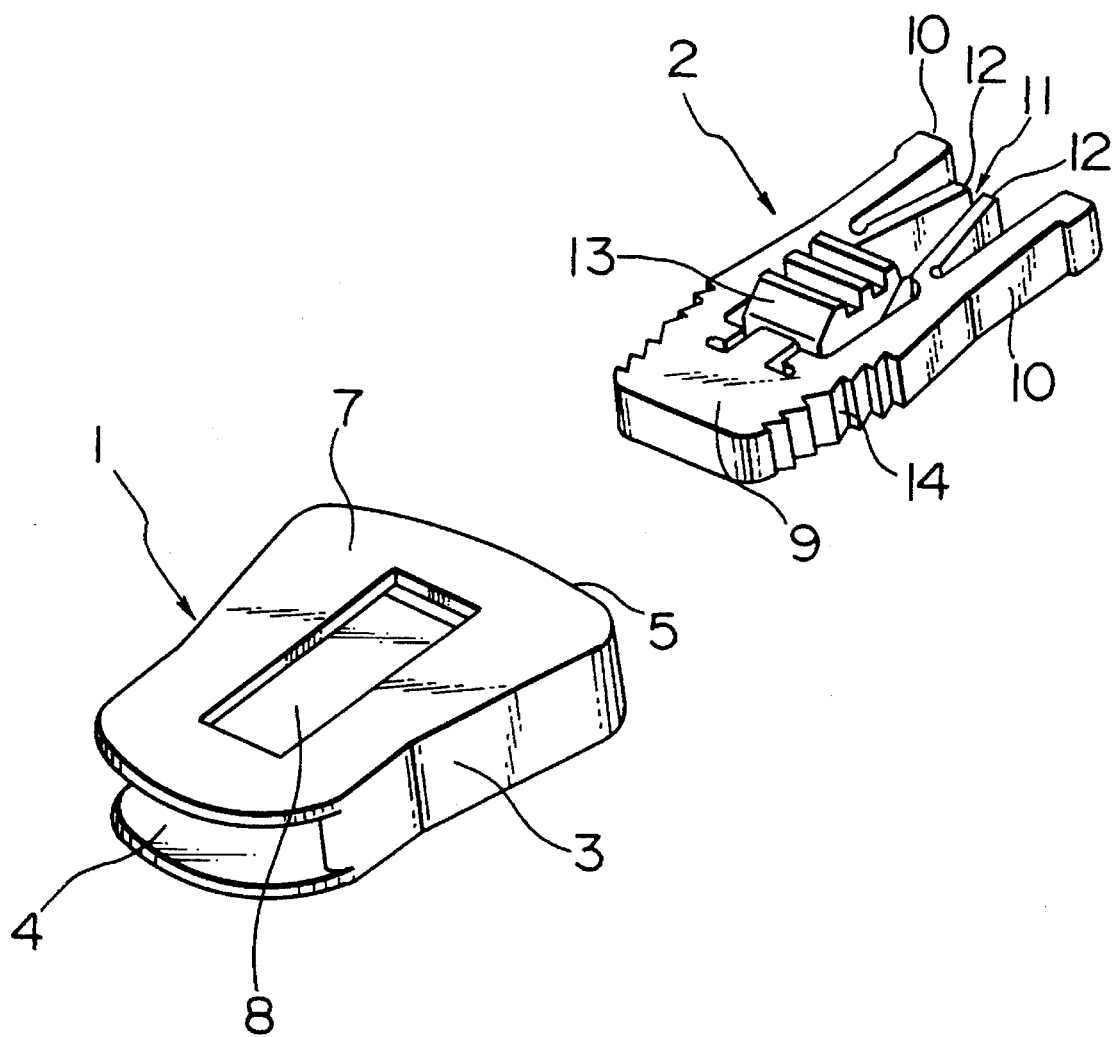
FIG. 1 is a perspective view showing a cord locking device in a disassembled form.
Figure 2:
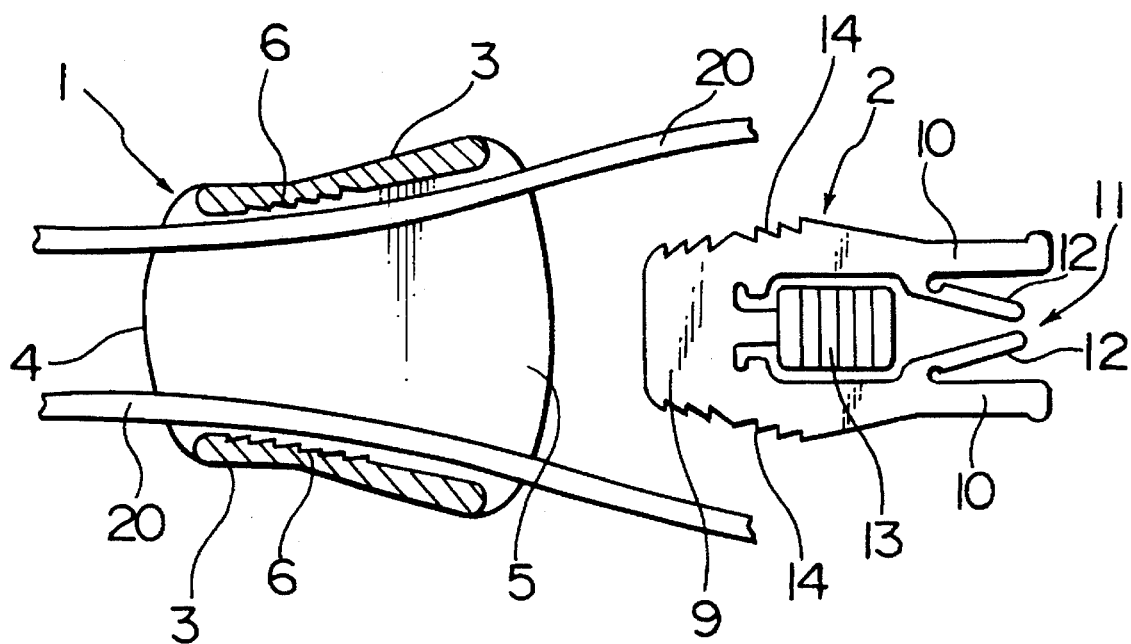
FIG. 2 is a plan view, partly in cross section, showing the cord locking device before a cord has been locked.
Figure 3:
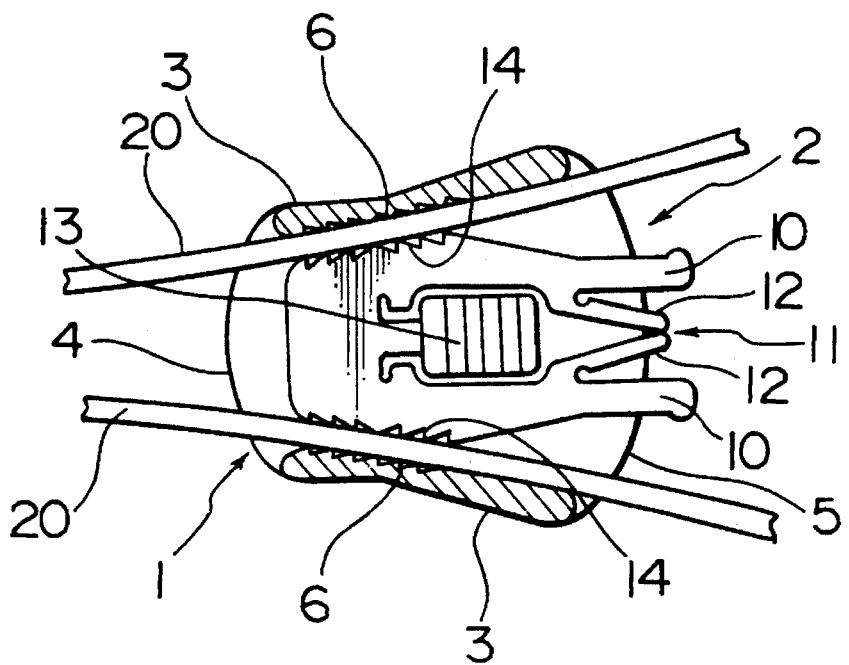
FIG. 3 is a plan view, partly in cross section, showing the cord locking device after a cord has been locked.

FIGS. 1 through 3 shows a cord locking device according to one embodiment of the invention. The cord locking device comprises a casing 1 and a slide 2, both made of synthetic resin. The casing 1 is generally of a box shape having opposite side walls 3, the distance between which is converging. The inner surface of each side wall 3 of the casing is notched to form an engaging portion 6; alternatively, it may be stepped or rough. The casing 1 has a narrow opening 4 at one end and a wide opening 5 at the other end. The casing 1 has a front plate 7 in which a longitudinal aperture 8 extends toward the opposite open ends 4, 5.

On the other hand, the slide 2 is in the form of a plate having a trapezoidal head 9 at one end, a pair of resilient grip portions 10 integrally extending from opposite side edges of the head portion 9, and a resilient portion 11 composed of a pair of confronting resilient strips 12 projecting from the grip portions 10 at positions toward their distal ends. In use, the resilient strips 12 come into resilient contact with each other's free ends to increase the resilience.

The slide 2 has a resilient guide portion 13 extending centrally from the rear end of the head portion 9 and projecting upwardly of the front surface of the slide 2. Further, the slide 2 has a pair of saw-toothed engaging portions 14 each spanning over the respective outer side surface of the head portion 9 and the respective outer side surface of the base of each grip portion 10. Each saw-toothed engaging portion 14 is divided into first and second halves directing toward each other.

For assembly, the slide 2 is inserted into the casing 1 from the wide open end 5 until the guide portion 13 is received in the aperture 8 of the casing 1, so that the guide portion 13 is slidable longitudinally in the aperture 8. For removing the slide 2 from the casing 1, the guide portion 13 is simply depressed in the aperture 8.

Figure 4:
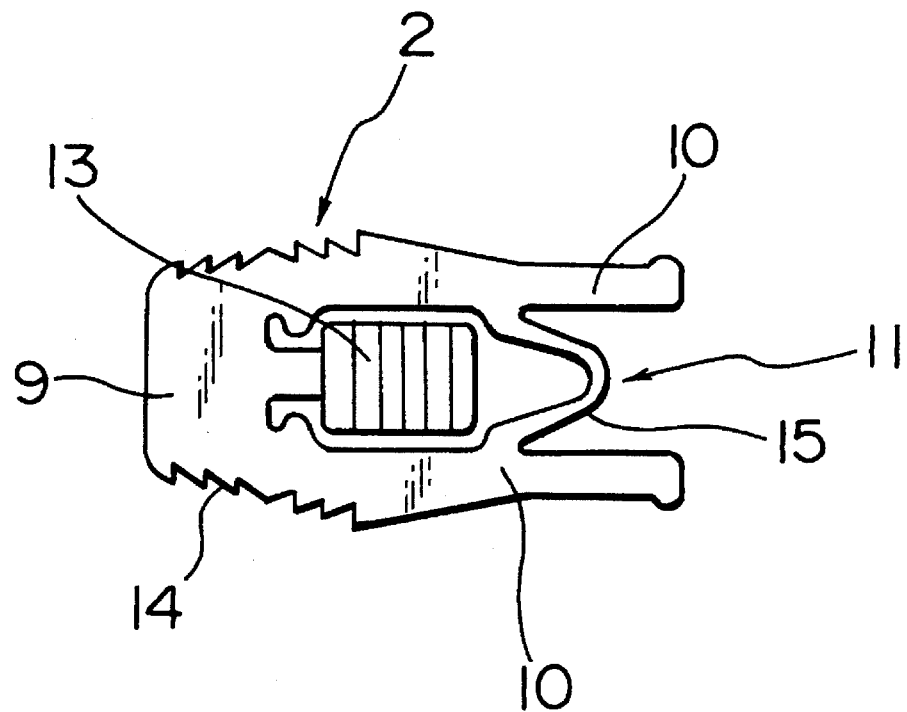
FIG. 4 is a plan view showing a modified slide.
Figure 5:
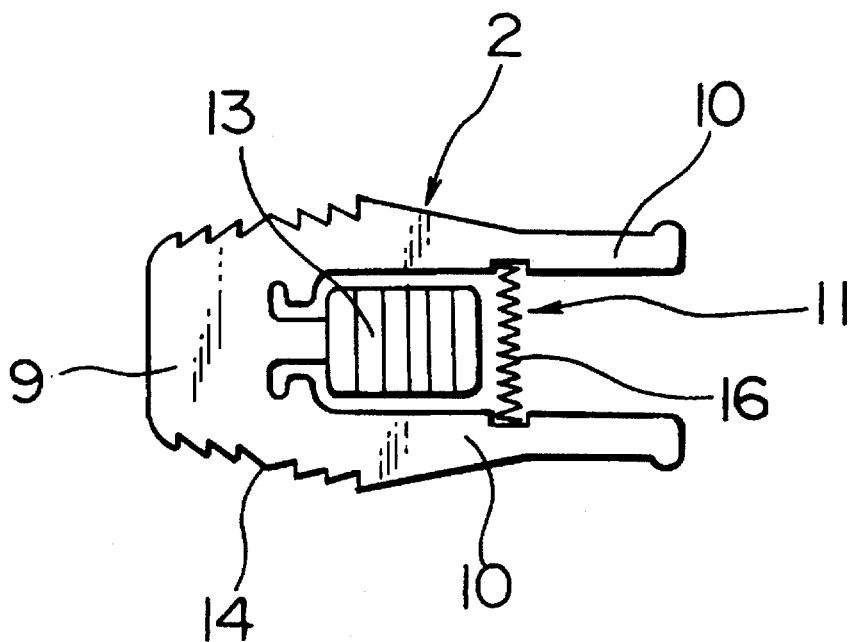
FIG. 5 is a plan view showing another modified slide.
Figure 6:
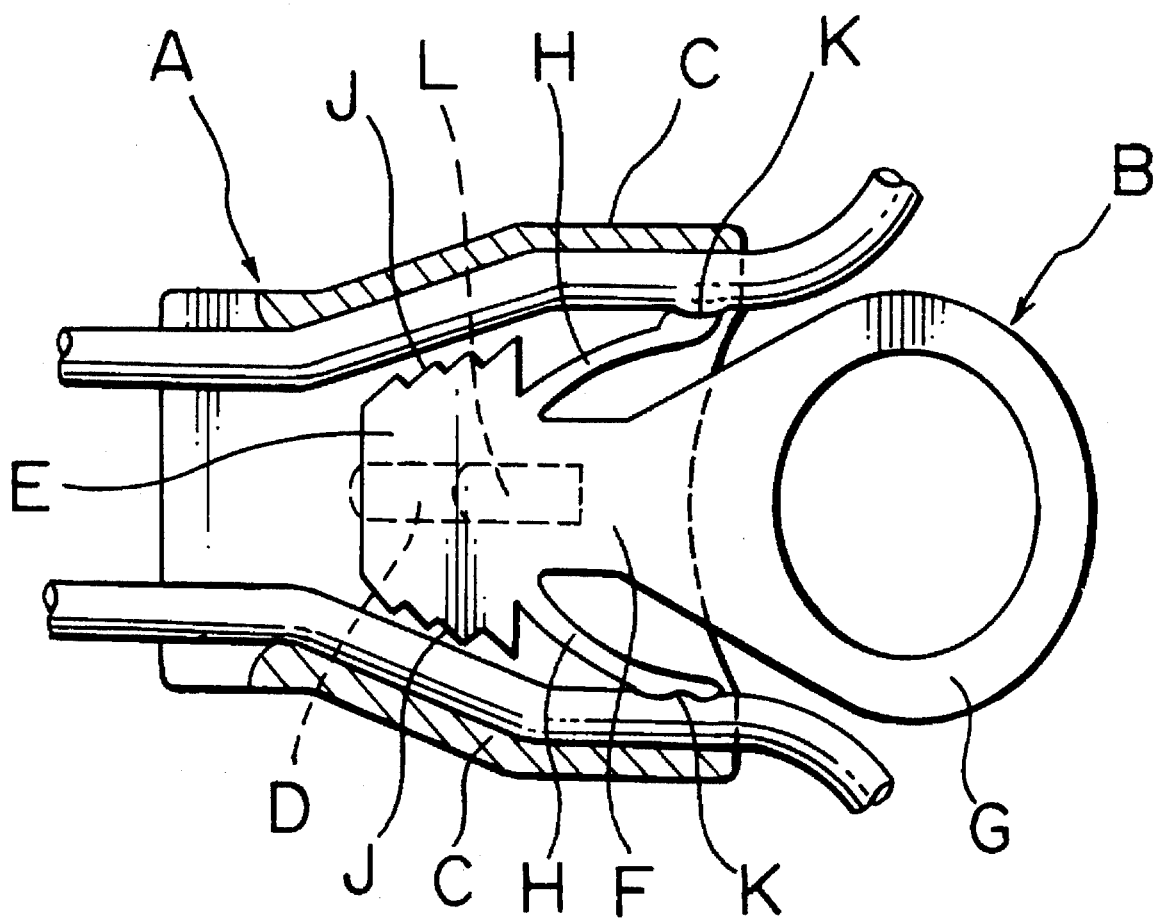
FIG. 6 is a plan view showing a cord locking device according to the conventional art.

FIGS. 4 and 5 respectively show modified forms of the resilient portion 11 to be situated between the grip portions 10 of the slide 2. The resilient portion 11 of FIG. 4 is a curved resilient strip 15 integrally extending between the grip portions 10. The resilient portion 11 of FIG. 5 is a coiled spring 16 bridging between the grip portions 10. When the slide 2 is inserted deeply into the casing 1 to lock the cord 20, the resilient portion 11 urges by its resilience the grip portions 10 against the opposite side walls 3 of the casing 1.

The cord locking device of this invention brings the following effects:

As the general constructional feature, the cord locking device of this invention comprises a casing 1 having openings 4, 5 respectively at opposite ends and a longitudinal aperture 8 in a front plate 7; and a slide 2 adapted to be inserted in the casing 1, the slide 2 having a pair of resilient grip portions 10 extending from opposite sides of a head portion 9 of the slide 2, the slide 2 also having a pair of engaging portions 14 each extending along a side surface of the slide 2 between the head portion 9 and a base of each of the grip portions 10, the slide 2 further having a resilient portion 11 situated between the grip portions 10, the slide 2 additionally having a central resilient guide portion 13 situated rearwardly of the head portion 9 in such a manner that the guide portion 13 should project outwardly from an outer surface of the front plate 7 of the casing 1 through the aperture 8 when the slide 2 is inserted in the casing 1.

Since the resilient portion 11 is situated between the two resilient grip portions 10 extending from the opposite sides of the head portion 9, the inserting and sliding of the slide 2 with respect to the casing 1 can be performed very smoothly, and the grip portions 10 can be pressed firmly against the side walls 3 of the casing 1, thus fastening the cord much more firmly. Further, since the resilient guide portion 13 extending centrally from the rear end of the head portion 9 is slidably received in the longitudinal aperture 8 in the front plate 7 of the casing 1, the slide 2 can be slided within a constant range, and the locking of the cord 20 can be facilitated. Also the slide 2 can be removed from the casing 1 without difficulty by depressing the guide 13 into the aperture 8, so that the cord 20 can be exchanged with a new one in a very simple operation.

The half parts of the engaging portions 14, which are formed on the side surfaces of the head portion 9, are rigid, and on the contrary, the other half parts formed on the side surfaces of the base of the grip portions 10 are recoverably deformed because the grip portions 10 are resilient. It is therefore possible to lock the cord 20 with increased firmness and to release the locking of the cord 20 smoothly.

Further, since the half engaging part of the head portion 9 and that of the base of the corresponding grip portion 10 have saw-toothed shapes directing toward each other, it is possible to lock the cord 20 with adequate firmness against a pull strength in either longitudinal direction. Since the cord is compressed between the engaging portion 14, which spans over each side surface of the head portion 9 and each side surface of the base of the respective grip portion 10, and the notched engaging portion 6 on the inner surface of each side wall 3 of the casing 1, reliable cord locking can be achieved.

What is claimed is:

1. A cord locking device comprising:

(a) a casing having openings respectively at opposite ends and a longitudinal aperture in a front plate; and (b) a slide adapted to be inserted in said casing, said slide having a pair of resilient grip portions extending from opposite sides of a head portion of said slide, said slide also having a pair of engaging portions each extending along a side surface of said slide between said head portion and a base of each of said grip portions, said slide further having a resilient portion situated between said grip portions, said slide additionally having a central resilient guide portion situated rearwardly of said head portion in such a manner that said guide portion should project outwardly from an outer surface of said front plate of said casing through said aperture when said slide is inserted in said casing.

2. A cord locking device according to claim 1, wherein each said engaging portion is divided into first and second halves respectively situated at the side surface of said head portion and the side surface of said base of each said grip portion and having saw-toothed forms with the first and second of saw-teeth directing toward each other.

3. A cord locking device according to claim 2, wherein said casing has on each of inner surfaces of opposite side walls a notched engaging portion.

4. A cord locking device according to claim 1, wherein said casing has on each of inner surfaces of opposite side walls a notched engaging portion.

* * * * *